(12) United States Patent
Collins et al.

(10) Patent No.: US 6,490,670 B1
(45) Date of Patent: Dec. 3, 2002

(54) METHOD AND APPARATUS FOR EFFICIENTLY ALLOCATING OBJECTS IN OBJECT ORIENTED SYSTEMS

(75) Inventors: Michael Thomas Collins, Austin, TX (US); James Lyle Peterson, Austin, TX (US); Weining Gu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/065,407

(22) Filed: Apr. 24, 1998

(51) Int. Cl.$^7$ ............................................... G06F 12/00
(52) U.S. Cl. ....................................... 711/173; 709/104
(58) Field of Search ................................ 711/170, 100, 711/171, 172, 173; 709/104

(56) References Cited

U.S. PATENT DOCUMENTS

| | | | | | |
|---|---|---|---|---|---|
| 5,210,844 A | * | 5/1993 | Shimura et al. | ............. | 711/157 |
| 5,293,614 A | * | 3/1994 | Ferguson et al. | ............ | 707/201 |
| 5,321,834 A | * | 6/1994 | Weiser et al. | ............... | 707/206 |
| 5,325,526 A | * | 6/1994 | Cameron et al. | ............ | 709/102 |
| 5,490,260 A | * | 2/1996 | Miller et al. | ................. | 711/100 |
| 5,561,786 A | * | 10/1996 | Morse | ........................ | 711/170 |
| 5,588,138 A | * | 12/1996 | Bai et al. | ..................... | 709/100 |
| 5,708,790 A | * | 1/1998 | White et al. | ................. | 711/203 |
| 5,721,858 A | * | 2/1998 | White et al. | ................. | 711/203 |
| 5,784,699 A | * | 7/1998 | McMahon et al. | .......... | 711/170 |
| 5,809,554 A | * | 9/1998 | Benayon et al. | ............ | 711/171 |
| 5,937,434 A | * | 8/1999 | Hasbun et al. | .............. | 711/170 |
| 6,061,763 A | * | 5/2000 | Rubin et al. | ................. | 711/118 |
| 6,131,150 A | * | 10/2000 | DeTreville | ................... | 711/170 |

* cited by examiner

Primary Examiner—St. John Courtenay, III
Assistant Examiner—Van H. Nguyen
(74) Attorney, Agent, or Firm—Duke W. Yee; Jeffrey S. LaBaw

(57) ABSTRACT

A method and apparatus for managing memory allocation. Each memory block category contains memory blocks. A request, including an object size, is received to allocate memory to an object. An available memory block is allocated to the object if the memory block category for size corresponding to the object size of the object contains an available memory block. An available memory block from a memory block category having a memory block size larger than the object size is located if an available memory block is absent in the memory block category for sizes corresponding to the object size. The located available memory block is partitioned into memory blocks, having a size corresponding to the object size. A partitioned memory block from the partitioned memory blocks is allocated to the object.

23 Claims, 6 Drawing Sheets

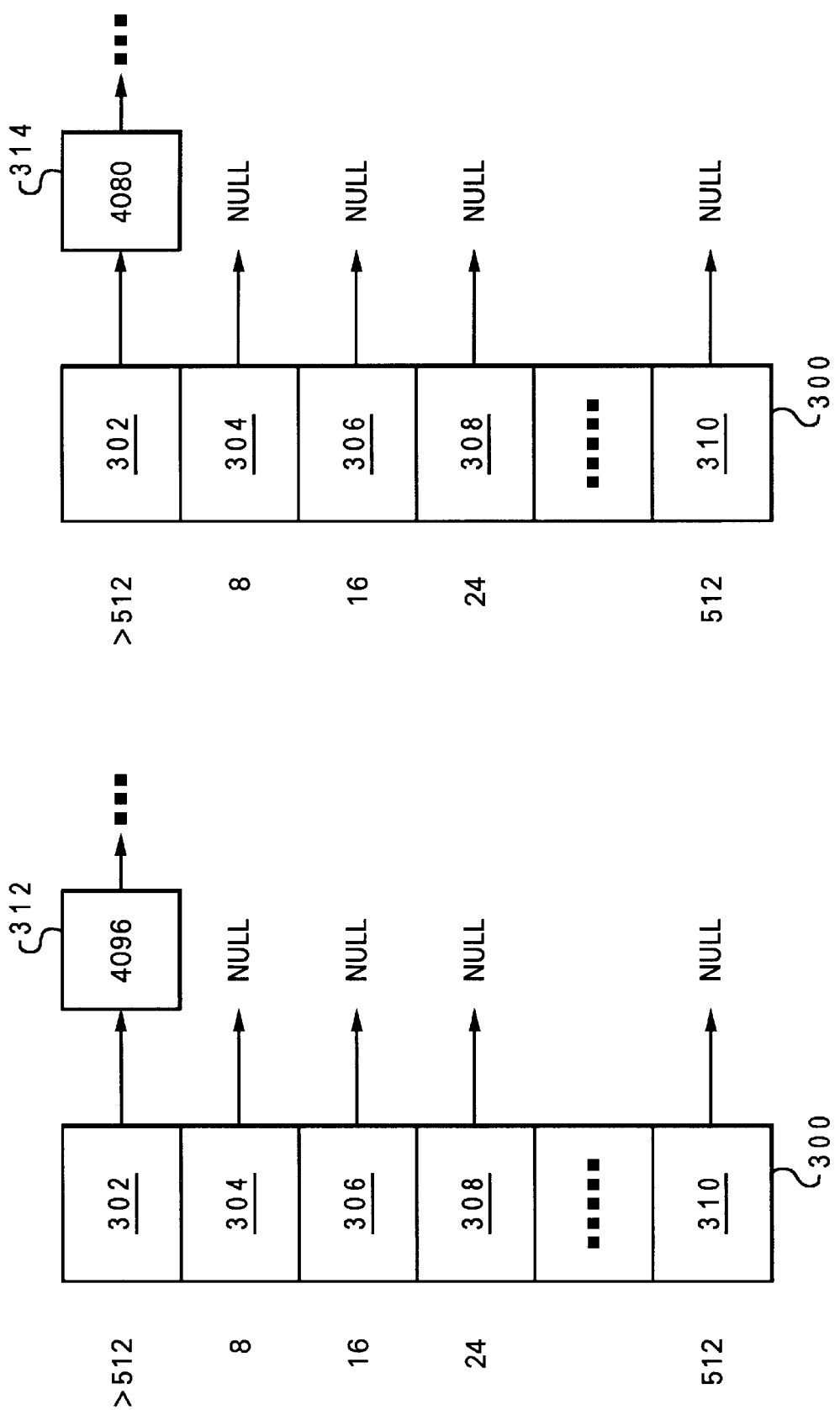

METHOD AND APPARATUS FOR EFFICIENTLY ALLOCATING OBJECTS IN OBJECT ORIENTED SYSTEMS

BACKGROUND OF THE INVENTION

1. Technical Field

The present invention relates generally to an improved data processing system and in particular to a method and apparatus for managing the use of memory in a data processing system. Still more particularly, the present invention relates to a method and apparatus for managing objects in an object-oriented environment.

2. Description of Related Art

The development of application and system software for data processing systems has traditionally been a time consuming task. The field of software engineering has attempted to overcome the limitations of traditional techniques by proposing new, more efficient software development models. Object oriented programming has emerged as a promising technology allowing for rapid development, implementation and customization of objects. Each new object has certain data attributes and processes or methods that operate on that data. Data is said to be "encapsulated" by an object and can only be modified by the object methods, which are invoked by sending a message to an object identifying the method and supplying any needed arguments.

Object oriented systems have two important properties in addition to encapsulation. "Inheritance" is the ability to derive a new object from an existing object and inherit all properties, including methods and data structures, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks". A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

In many object-oriented environments, management of the object space is an important area. Java virtual machines are an example of object-oriented systems in object-oriented environments in which object space management is important. The efficiency of object space management affects the overall performance of a Java virtual machine, which in turn affects the overall system performance.

In object-oriented systems, such as Java virtual machines, objects are typically maintained in a memory area called the object "heap". When an object is allocated, a piece of the heap is reserved for the object by the object management system. When an object is freed, the object memory is returned to the object heap for future use. In object-oriented environments, objects are allocated extremely frequently. As a result, an important objective of an object management system is to allow for efficiently performing object allocation. Thus, it would be desirable to have an improved method and apparatus for managing objects through the management of the object space.

SUMMARY OF THE INVENTION

The present invention provides a method and data processing system for managing the allocation of memory in an object oriented system executing on the data processing system. A plurality of memory block categories is present in which each memory block category, within the plurality of memory block categories, may contain memory blocks having a memory block size associated with the memory block category. A request is received to allocate memory to an object. This request includes an object size. Whether a memory block category, having an object size corresponding to the object size of the object, contains an available memory block is determined. The available memory block is allocated to the object in response to a determination that the memory block category associated with a size corresponding to the object size of the object contains an available memory block. An available memory block from a memory block category associated with a memory block size larger than the object size is located in response to a determination that an available memory block is absent in the memory block category associated with the size corresponding to the object size. The available memory block, located by the locating step, is partitioned into a number of partitioned memory blocks, each partitioned memory block within the number of partitioned memory blocks having a size corresponding to the object size. A partitioned memory block from the number of partitioned memory blocks is allocated to the object.

This technique is run time adaptive. It will use historical information to determine how many memory blocks of a certain size to make available when larger memory blocks are partitioned.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A–3C are diagrams of free lists for a heap to compare presently known mechanisms with those of the present invention;

DETAILED DESCRIPTION OF THE PREFERRED EMBODIMENT

Figure 1:
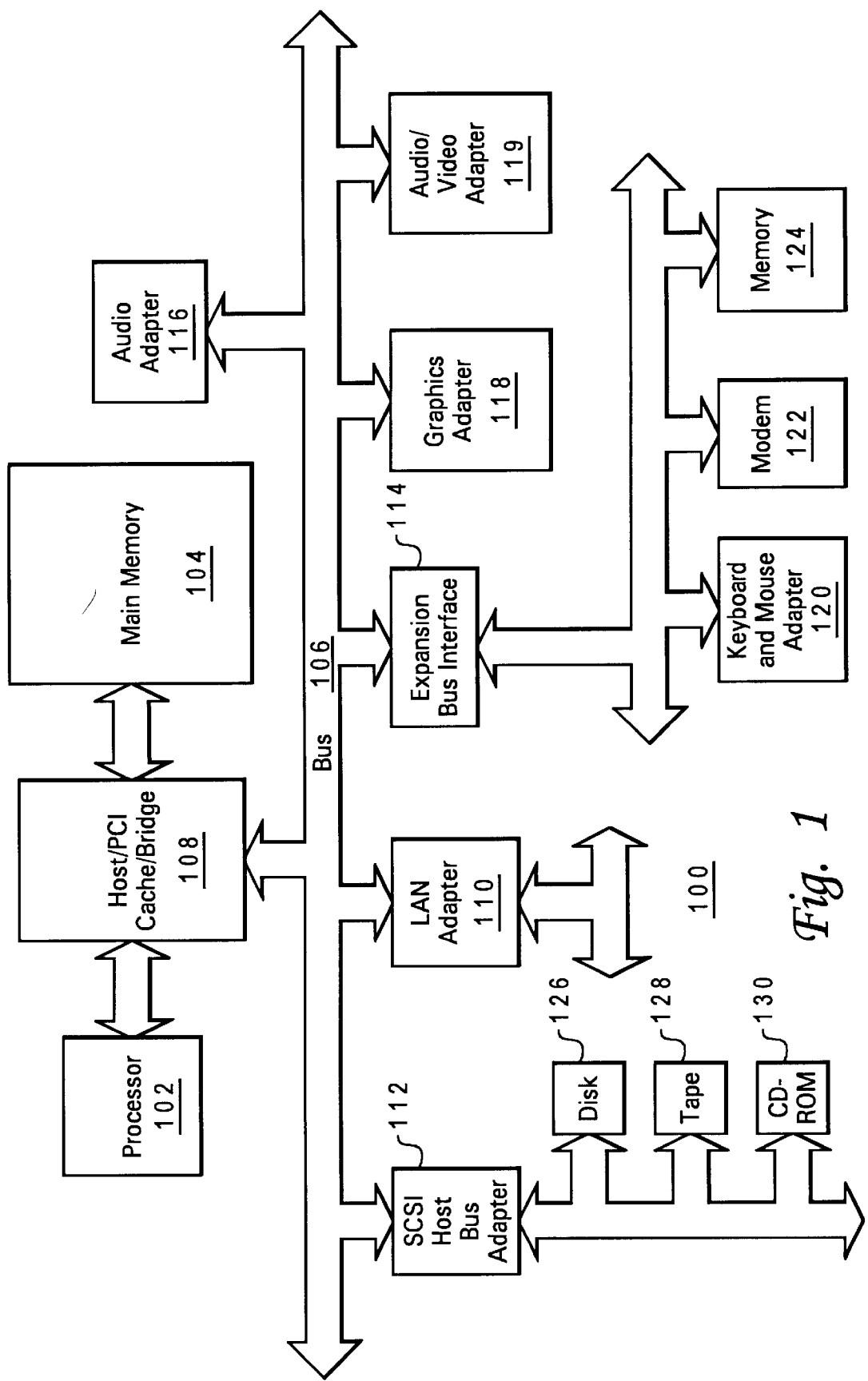
FIG. 1 is a block diagram of a data processing system in which the present invention may be implemented is illustrated.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
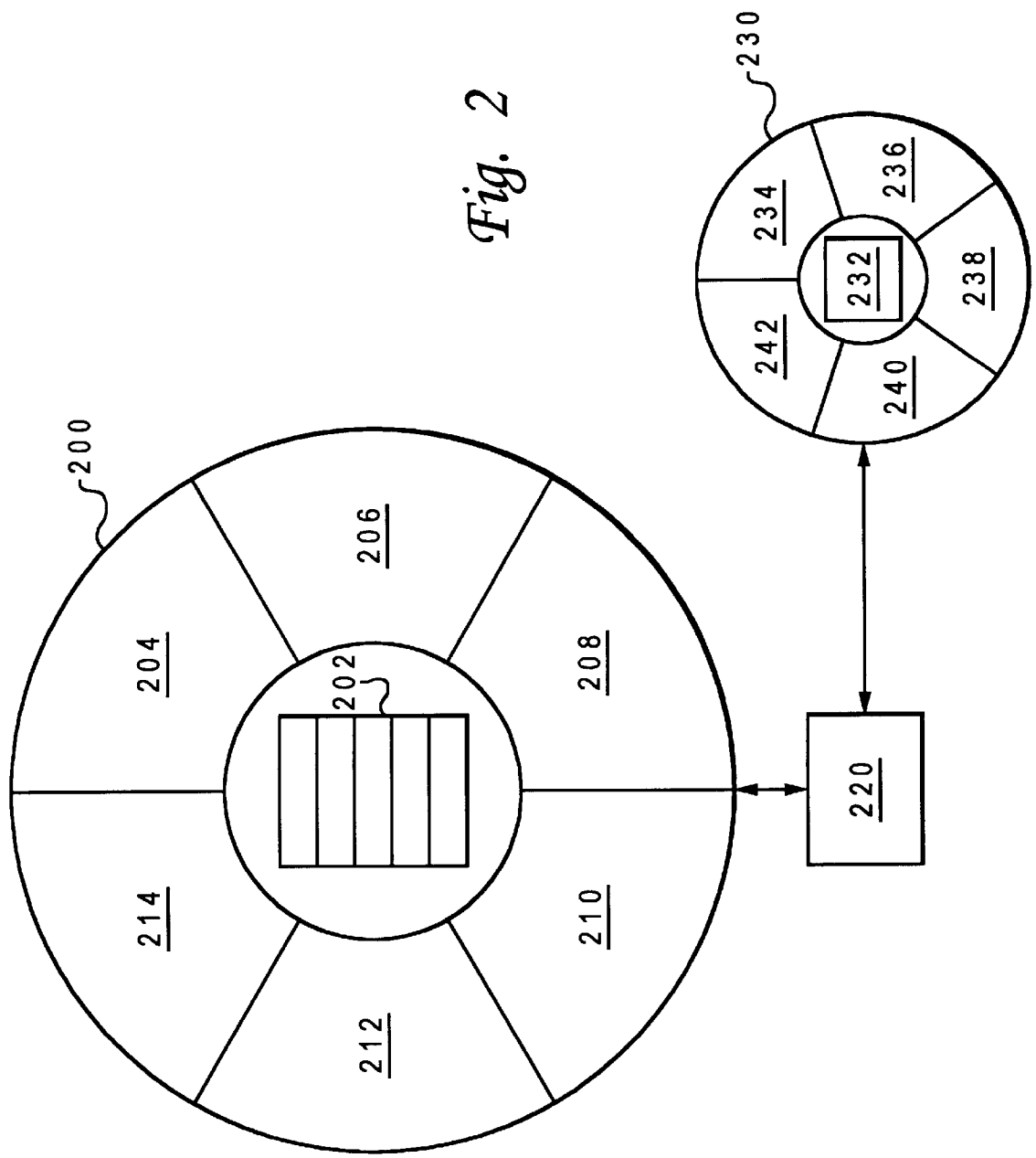
FIG. 2 is a diagram of objects in an object-oriented system in accordance with a preferred embodiment of the present invention.

With reference to FIG. 2, a diagram of objects in an object-oriented system is depicted in accordance with a preferred embodiment of the present invention. An object encapsulates data and the methods needed to operate on that data. Objects can be represented by a "doughnut diagram" such as shown in FIG. 2. Object data within object 200 is shown in center 202 surrounded by the applicable methods 204 to 214. Data 202 may be modified only by the methods of that object, object 200. Methods 204–214 are invoked by receiving messages from other objects. A typical object-oriented system will have a message router 220 that routes messages between objects, such as objects 200 and 230. In the depicted example, object 230 also includes data in center 232, which is encapsulated by methods 234 to 242. Thus, object 230 causes method 208 to be invoked by sending a message to message router 220 that in turn sends a message to method 208 of object 200.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

With reference to FIGS. 3A–3B, a diagram of free lists for a heap are depicted to compare presently known mechanisms with those of the present invention. A "heap" is a portion of memory reserved for a program to use for the temporary storage of data structures whose existence or size cannot be determined until the program is running. To build and use such elements, programming languages, such as C and Pascal, include functions and procedures for requesting free memory from the heap, accessing it, and freeing it when it is no longer needed. In contrast to stack memory, heap memory blocks are not freed in reverse of the order in which they were allocated, so free blocks may be interspersed with blocks that are in use. As the program continues running, the blocks may have to be moved around so that small free blocks can be merged together into larger ones to meet the program's needs.

In FIG. 3A, free lists 302–310 are illustrated. Each of these free lists 302–310 falls within a memory block category. Free lists 304 through 310 are empty in the depicted example. Only free list 302, at the head of free list 300, contains memory that may be allocated to an object in response to a request.

Currently known management schemes use multiple buckets of memory blocks, connected through linked lists, of different sizes to manage free heap space. The invention allocates heap objects from right size memory blocks as much as possible to minimize heap space fragmentation. In allocating an object of size n bytes, one mechanism used by the invention involves looking for a free list having a memory block category of size n bytes. A free list is a linked list of available memory blocks of size n bytes. If the free list having a memory block category of size n bytes is not empty, a memory block from the head of the free list is obtained. Although the depicted example obtains a memory block from the head of the free list, the memory block may be obtained from anywhere in the free list for that size memory block. If the free list for memory block category for size n bytes is empty, then other free lists having larger memory block sizes will be examined until a non-empty free list is found or until all of the free lists are exhausted. In the depicted example, n is the size of the object that is allocated in bytes, but could also be other units besides bytes.

If all of the memory block categories are exhausted, the free list, free list 302, for large heap blocks (e.g., having a size greater than 512 bytes) may be examined to obtain a memory block. When a larger memory block, also referred to as a "chunk" of memory, is present in a free list, the memory block is broken into a heap object size of n bytes and a remaining portion. The remaining portion is attached to an appropriate free list with the first part being returned for allocation to an object. If the free list of large heap blocks also is empty, then a garbage collection process is employed to free memory. "Garbage collection" is a process for automatic recovery of heap memory. Blocks of memory that had been allocated but are no longer in use are freed, and blocks of memory still in use may be moved to consolidate the free memory into larger blocks.

Using presently known mechanisms for allocating memory blocks, memory block categories 304–310 are still empty after allocation of a 16 byte object in the example shown in FIG. 3B. Memory block 312 has a size of 4096 bytes in FIG. 3A before a 16 byte object is allocated. After allocation, a memory block 314 having a size of 4080 bytes is present in free list 302 with the remaining free lists 304–310 remaining empty.

The present invention provides a system and method in the computer readable medium for efficiently allocating memory. In particular, when object allocation is requested and the corresponding member block category for a free list is empty, instead of sifting through all of the >n byte free lists for objects larger than the requested one, the process of the present invention goes directly to a free list having a memory block category for larger objects and obtains a large chunk of memory, such as 2048 bytes. This large chunk of memory is divided or broken down into a number of memory blocks having the size of the requested object size. Then, one of these memory blocks is returned to the requester and the rest of the memory blocks are placed into the free list for the memory block category for the requested object size, thus replenishing the free list for that memory block size.

Figure 3C:
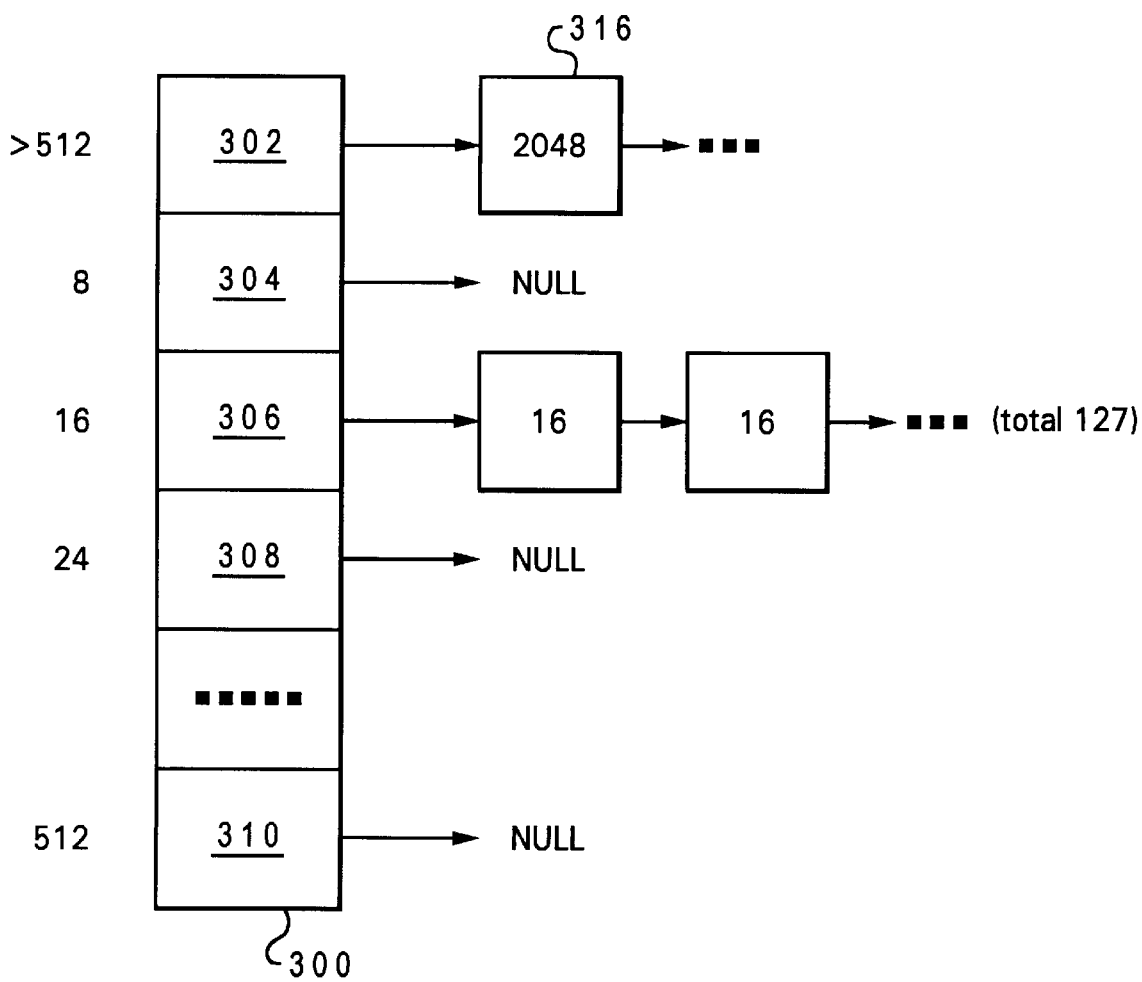

In the depicted example, in FIG. 3C, a memory block 316 having a size of 2048 bytes in free list 302 is present after a big chunk of memory of 2048 bytes has been used. A 16 byte chunk of memory is returned to the requester and 127 sixteen byte chunks of memory are added to free list 306 in accordance with a preferred embodiment of the present invention. The advantage of this approach is that subsequent 16 byte object allocations can be satisfied very quickly, since the 16 byte free list is already built.

Figure 4:
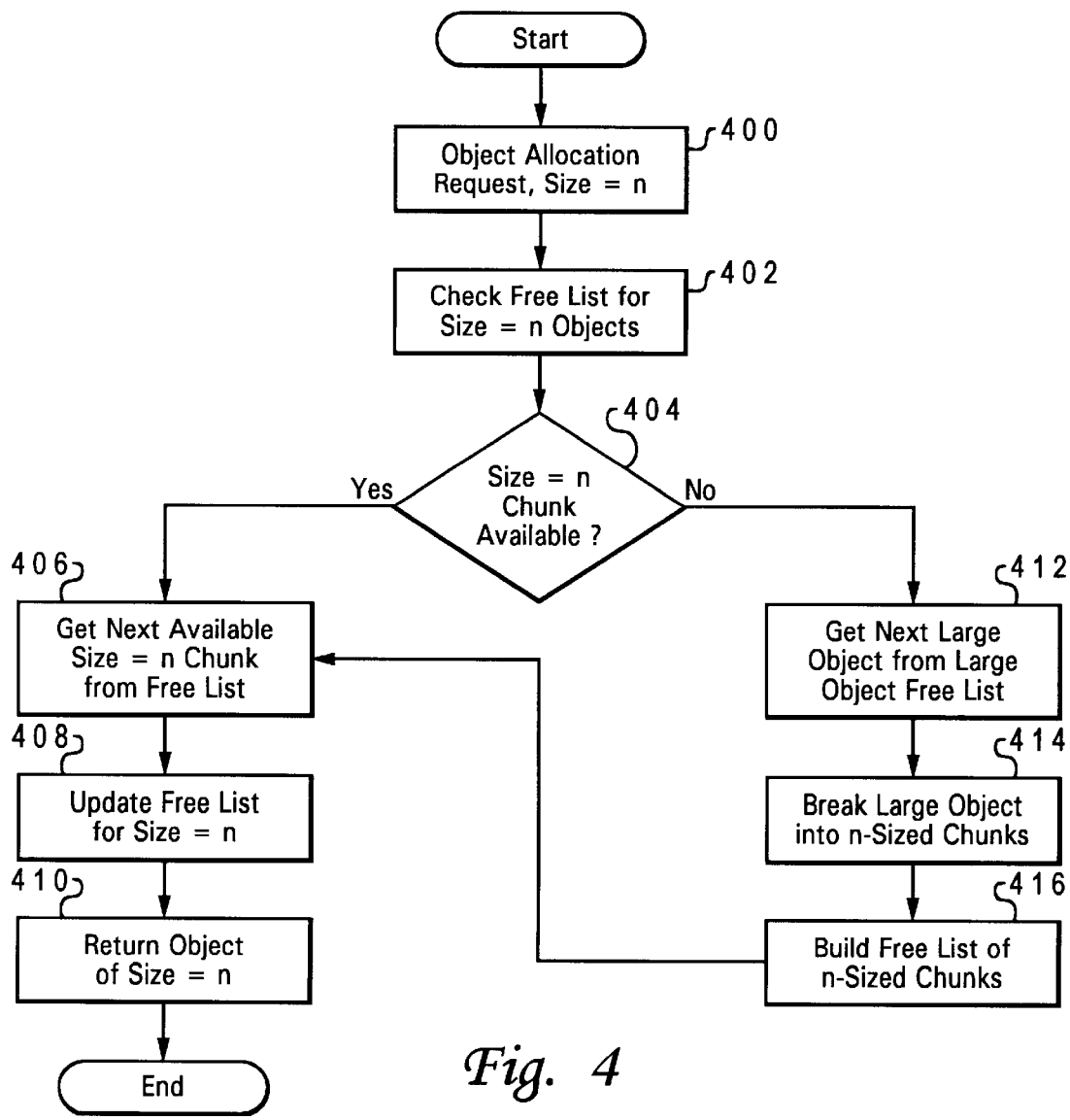
FIG. 4 is a flowchart of a process for allocating memory blocks for objects in accordance with a preferred embodiment of the present invention.

Turning now to FIG. 4, a flowchart of a process for allocating memory blocks for objects is depicted in accordance with a preferred embodiment of the present invention. The process begins by receiving an object allocation request for an object size n bytes (step 400). The free list for the memory block category of size n bytes is checked (step 402). A determination is made as to whether a memory block or chunk of memory of size n bytes is available for allocation (step 404). If a memory block of size n bytes is available, the next available chunk of memory of size n bytes is obtained from the free list (step 406). The free list for the memory block category of size n bytes is then updated to reflect the allocation (step 408). An object of size n bytes is then returned to the requester (step 410) with the process terminating thereafter. Memory of size n bytes is then processed to form an object of size n bytes to be returned to the requester in step 410.

With reference again to 404, if a memory chunk of size n bytes is unavailable, the process then obtains the next large memory block from the free list having a large memory block category (step 412). The large memory block is then broken into n byte sized chunks (step 414), and the free list having a memory block category of size n bytes is built up with the n byte sized chunks of memory (step 416).

In this manner, the present invention provides an advantage in that object allocation can be broken into two paths. A fast path occurs when a memory block is available in a free list having a memory block category size of the requested object size. With a slower path involving breaking of a large memory block or chunk of memory into blocks having a size of the requested object.

The present invention also provides a process to increase the probability that the fast path will be taken more often. The advantage is provided by reviewing historical information to determine the size of the memory block to allocate for each free list. Larger chunks of memory are assigned to free lists having memory block categories for more frequently used objects with smaller chunks of memory being allocated to free lists having the block categories for less frequently used objects. A more detailed description of the dynamic allocation or assignment of memory to free lists is described in more detail below with reference to FIG. 5. The adjustment of the amount of memory allocated to a free list having a particular memory block category may be performed during each garbage collection. For example, set C equal to the current chunk size of memory for a free list of a given memory block category, and set A equal to the normalized total object size of allocations during the last period of time. The new chunk size, C', for this free list can be set using the following formula:

$$C'=a*C+(1-a)*A$$

"a" is a constant set as a number between 0 and 1, indicating how much value to give to the old chunk size in calculating the new chunk size using this method of exponential decay. A higher "a" results in more of the old chunk size being taken into the calculation of the new chunk size. If "a" is set equal to 1, then the chunk size is always the same (a predetermined size). If "a" is set equal to 0, the chunk size is determined by the normalized total amount of allocations occurring during the previous period of time. Setting "a" equal to 0.5 results in the past history and recent history of allocation being given equal weight. Thus, C' represents the chunk size or the amount of memory that is to be allocated to a free list for a given size of memory. Dividing the amount of memory by the given size of memory for the free list results in the number of memory blocks allocated to the free list.

Figure 5:
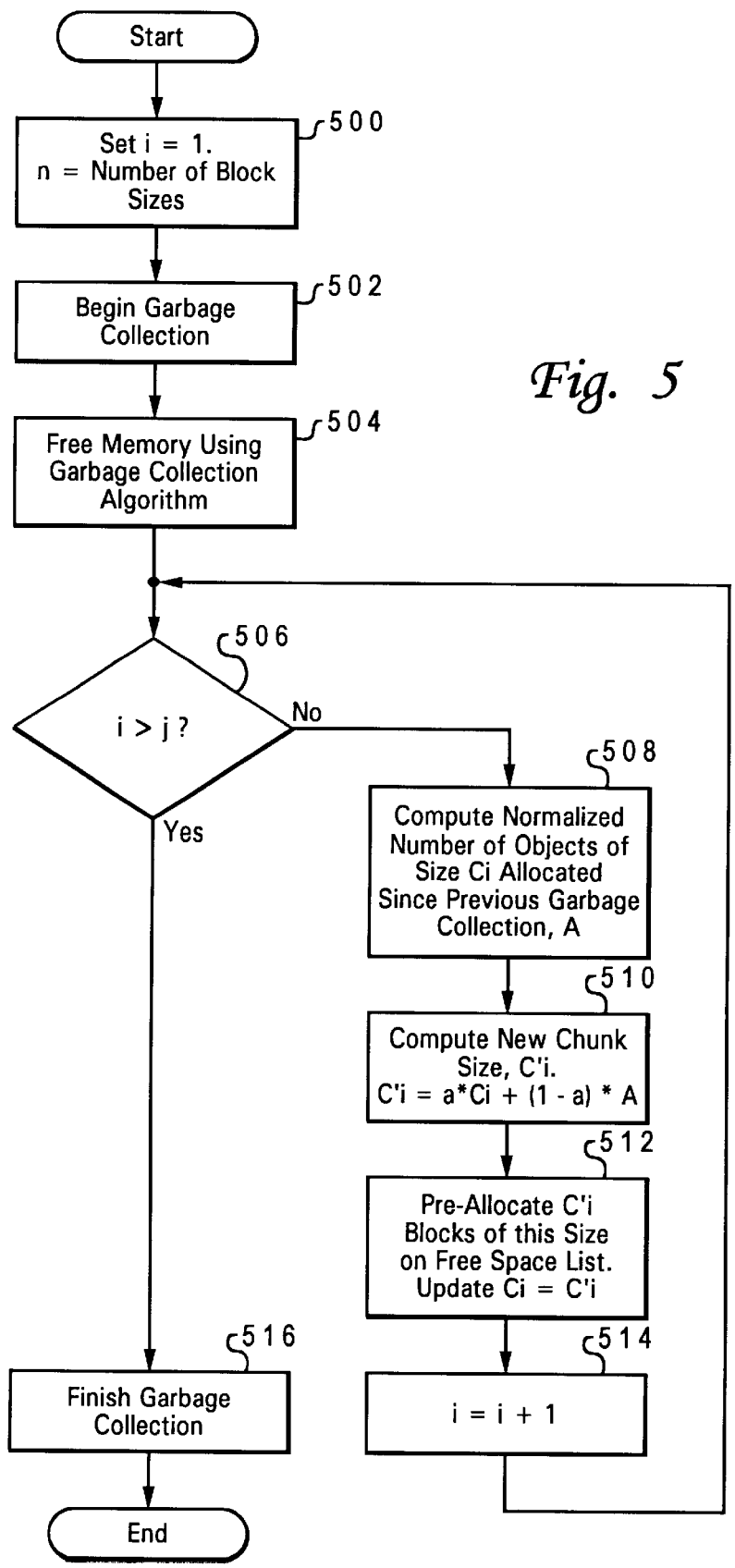
FIG. 5 is a flowchart of a process for dynamically allocating memory to various memory object categories of free lists in accordance with a preferred embodiment of the present invention.

Turning now to FIG. 5, a flowchart of the process for dynamically allocating memory to various memory block categories of free lists is illustrated in accordance with a preferred embodiment of the present invention. The process begins by setting i equal to the number of memory block categories and j set is equal to the number of block sizes (step 500). Next, the garbage collection process begins (step 502). Memory is freed using a known garbage collection algorithm (step 504). Then, a determination is made as to whether i is greater than j (step 506). If i is not greater than j, the process then computes a normalized number of objects of size $C_i$ allocated since the previous garbage collection (step 508). This normalized number is set equal to A. Afterwards, a new chunk size $C'_i$ is calculated for using the formula $C'_i=a*C_i+(1-a)*A$ (step 510). $C'_i$ blocks of this size are pre-allocated on the free list and $C_i$ is set equal to $C'_i$ (step 512). The index i is used to identify a memory block category and the value $C'_i$ identifies the number of blocks to be allocated for the number of memory block category. Next, i is incremented (step 514) with the process then returning to step 506 as previously described.

With reference again to step 506, if i is greater than j, the process then finishes garbage collection (step 516) with the process terminating thereafter.

Thus, the present invention provides an improved method and apparatus for managing object space. In particular, the present invention provides a highly efficient mechanism for allocating memory from a heap to objects. In addition, the present invention provides a dynamic and adaptive allocation mechanism for taking into account memory sizes for more frequently allocated object sizes.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for managing the allocation of memory in an object oriented system executing on the data processing system, wherein a plurality of memory block categories is present in which each memory block category within the plurality of memory block categories contains memory blocks having a fixed memory block size, the method comprising:

receiving a request to allocate memory to an object, wherein the request includes an object size;

determining whether a memory block category, having an object size corresponding to the object size of the requested object, contains an available memory block;

allocating the available memory block to the object in response to a determination that the memory block category associated with a size corresponding to the object size of the object contains an available memory block;

locating an available memory block from a memory block category associated with a memory block size larger than the object size in response to a determination that an available memory block is absent in the memory block category associated with a size corresponding to the object size;

partitioning the available memory block, located by the locating step, into a number of partitioned memory blocks, each partitioned memory block within the number of partitioned memory blocks having a size corresponding to the requested object size; and allocating a partitioned memory block from the number of partitioned memory blocks to the object.

2. The method of claim 1 further comprising:

allocating available memory blocks to each of the plurality of memory block categories based on prior allocation of memory blocks.

3. The method of claim 1 further comprising:

associating the number of partitioned memory blocks with a memory block category having a memory block size corresponding to the size of the partitioned memory blocks.

4. The method of claim 1 further comprising:

releasing a memory block associated with an object in response to the object being freed, wherein the release of the memory block results in the memory block being marked as an available memory block.

5. The method of claim 1 further comprising:

allocating memory blocks to each of the plurality of memory block categories based on prior requests for memory blocks, wherein a first memory block category within the plurality of memory block categories having a larger number of requests for memory blocks than a second memory block category within the plurality of memory block categories is allocated a larger number of memory blocks than the second memory block category.

6. A data processing system for managing allocation of memory, the data processing system comprising:

a plurality of memory block categories, wherein each memory block category within the plurality of memory block categories is associated with a memory block size;

reception means for receiving a request to allocate memory to an object, wherein the object has an object size;

determination means for determining whether a memory block category, having an object size corresponding to the object size of the object, contains an available memory block;

first allocation means for allocating the available memory block to the object in response to a determination that the memory block category associated with a size corresponding to the object size of the requested object contains the available memory block;

locating means for locating an available memory block from a memory block category associated with a memory block size larger than the object size in response to a determination that an available memory block is absent in the memory block category associated with a size corresponding to the object size;

partitioning means for partitioning the available memory block located by the locating means into a number of partitioned memory blocks, each partitioned memory block within the number of partitioned memory blocks having a size corresponding to the object size; and second allocation means for allocating a partitioned memory block from the number of partitioned memory blocks to the object.

7. The method of claim 6 further comprising:

allocating available memory blocks to each of the plurality of memory block categories based on prior allocation of memory blocks.

8. The data processing system of claim 6 further comprising:

association means for associating the number of partitioned memory blocks with a memory block category having a memory block size corresponding to the size of the partitioned memory blocks.

9. The data processing system of claim 6 further comprising:

release means for releasing a memory block associated with an object in response to the object being freed, wherein the release of the memory block results in the memory block being marked as an available memory block.

10. The data processing system of claim 6 further comprising:

initial allocation means for allocating memory block to each of the plurality of memory block categories based prior requests for memory blocks.

11. The data processing system of claim 6, wherein the data processing system includes an object oriented environment that sends requests to the reception means to request allocation of memory to an object.

12. The data processing system of claim 11, wherein the object oriented environment includes a Java virtual machine.

13. A computer program product for use with a data processing system for managing allocation of memory in an object oriented system executing on the data processing system, wherein a plurality of memory block categories is present in which each memory block category within the plurality of memory block categories contains memory blocks having a memory block size, the computer program product comprising:

a computer usable medium;

first instructions for receiving a request to allocate memory to object, wherein the request includes an object size;

second instructions for determining whether a memory block category having an object size corresponding to the object size of the object requested contains an available memory block;

third instructions for allocating the available memory block to the object in response to a determination that the memory block category associated with a size corresponding to the object size of the object contains an available memory block;

fourth instructions for locating an available memory block from a memory block category associated with a memory block size larger than the object size in response to a determination that an available memory block is absent in the memory block category associated with a size corresponding to the object size;

fifth instructions for partitioning the available memory block, located by the locating step, into a number of partitioned memory blocks, each partitioned memory block within the number of partitioned memory blocks having a size corresponding to the object size; and sixth instructions for allocating a partitioned memory block from the number of partitioned memory blocks to the object, wherein the instructions are embodied within the computer usable medium.

14. The computer program product of 13 further comprising:

seventh instructions for dynamic and adaptive allocation of memory blocks to each of the memory block categories based on prior allocation of memory blocks.

15. A method in a data processing system for allocating memory from a plurality of free lists, wherein each free list is associated to a memory size, the method comprising:

receiving a request to allocated memory to an object, wherein the request includes an object size;

determining whether a free list assigned the memory size corresponding to the object size contains a block of memory;

allocating the block of memory to the object in response to a determination that the free list associated with the memory size corresponding to the object size contains a block of memory;

locating an available block of memory from a free list associated with a memory size larger than that of the object size in response to a determination that a block of memory is absent from the free list associated with the memory size corresponding to the object size, wherein the memory size larger than that of the object size is at least two time larger than the object size;

partitioning the available block of memory into a number of partitioned memory blocks, wherein each partitioned memory block has a size corresponding to the object size;

allocating a partitioned memory block from the number of partitioned memory blocks to the object.

16. The method of claim 15 further comprising:

assigning memory block within each free list within the plurality of free lists based on prior allocation of memory blocks to objects.

17. The method of claim 16, wherein the step of placing memory block includes setting an amount of memory for memory blocks in a free list as follows:

$$C' = a*C + (1-a)*a$$

wherein C is the current memory allocated to the free list and a is a constant value, wherein dynamic assignment of memory is performed.

18. The method of claim 17, wherein the number of memory blocks assigned to the free list is determined by dividing C' by the memory size associated with the free list.

19. The method of claim 15, wherein the data processing system includes a Java virtual machine that requests allocation of memory for an object.

20. A method in a data processing system for managing the allocation of memory, wherein a plurality of memory block categories is present in which each memory block category within the plurality of memory block categories contains memory blocks having a fixed memory block size, the method comprising:

receiving a request to allocate memory to an object, wherein the request includes an object size;

determining whether a memory block category, having an object size corresponding to the object size of the requested object, contains an available memory block;

allocating the available memory block to the object in response to a determination flat the memory block category associated with a size corresponding to the object size of the object contains an available memory block;

locating an available memory block from a memory block category associated with a memory block size larger than the object size in response to a determination that an available memory block is absent in the memory block category associated with a size corresponding to the object size, wherein the available memory block is partitionable into a number of memory blocks having a size corresponding to the requested object size;

partitioning the available memory block, located by the locating step, into a number of partitioned memory blocks, each partitioned memory block within the number of partitioned memory blocks having a size corresponding to the requested object size; and allocating a partitioned memory block from the number of partitioned memory blocks to the object.

21. The method of claim 20 further comprising:

freeing memory;

calculating a new size for a memory block category using the following:

$$C' = a*C + (1-a)*A$$

wherein C' is the new amount of memory for the memory block category, C is the current amount of memory for the memory block category, a is a constant value, A is a normalized number of objects of size C.

22. The method of claim 21 further comprising;

partitioning the new amount of memory into memory blocks having a size corresponding to the memory block category.

23. A data processing system for managing the allocation of memory, wherein a plurality of memory block categories is present in which each memory block category within the plurality of memory block categories contains memory blocks having a fixed memory block size, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive a request to allocate memory to an object, wherein the request includes an object size; determine whether a memory block category, having an object size corresponding to the object size of the requested object, contains an available memory block; allocate the available memory block to the object in response to a determination that the memory block category associated with a size corresponding to the object size of the object contains an available memory block; locate an available memory block from a memory block category associated with a memory block size larger than the object size in response to a determination that an available memory block is absent in the memory block category associated with a size corresponding to the object size, wherein the available memory block is partitionable into a number of memory blocks having a size corresponding to the requested object size; partition the available memory block into a number of partitioned memory blocks, each partitioned memory block within the number of partitioned memory blocks having a size corresponding to the requested object size; and allocate a partitioned memory block from the number of partitioned memory blocks to the object.

\* \* \* \* \*

UNITED STATES PATENT AND TRADEMARK OFFICE
CERTIFICATE OF CORRECTION

PATENT NO.     : 6,490,670 B1
DATED          : December 3, 2002
INVENTOR(S)    : Collins et al.

It is certified that error appears in the above-identified patent and that said Letters Patent is hereby corrected as shown below:

<u>Title page,</u>
Item [75], Inventors, please delete "Weining Gu" and insert -- Weiming Gu --.

<u>Column 10,</u>
Line 34, after "determination", delete "flat" and insert -- that --.

Signed and Sealed this

Twelfth Day of August, 2003

JAMES E. ROGAN
*Director of the United States Patent and Trademark Office*